United States Patent [19]
Burke

[11] Patent Number: 5,996,755
[45] Date of Patent: Dec. 7, 1999

[54] TEMPERATURE SENSITIVE DECOUPLING METHOD FOR VISCOUS FAN DRIVES

[75] Inventor: Steven D. Burke, Charlotte, N.C.

[73] Assignee: Eaton Corporation, Cleveland, Ohio

[21] Appl. No.: 09/122,204

[22] Filed: Jul. 24, 1998

[51] Int. Cl.⁶ ................................................. F16D 35/02
[52] U.S. Cl. ................................ 192/58.65; 192/58.682; 192/58.8; 192/82 T
[58] Field of Search ............................ 192/58.63, 58.65, 192/58.67, 58.682, 58.8, 82 T

[56] References Cited

U.S. PATENT DOCUMENTS

| | | | |
|---|---|---|---|
| 3,055,473 | 9/1962 | Oldberg et al. | 192/58.683 |
| 3,363,734 | 1/1968 | Sabat | 192/58.65 |
| 4,606,445 | 8/1986 | Rockey | 192/58.65 |
| 4,662,495 | 5/1987 | Brunken | 192/58.65 |
| 5,232,074 | 8/1993 | Watanabe | 192/58.65 |
| 5,248,018 | 9/1993 | Debrabander | 192/58.682 |

*Primary Examiner*—Richard M. Lorence
*Attorney, Agent, or Firm*—L. J. Kasper

[57] ABSTRACT

A fluid coupling device of the type including an external bimetal coil (45) operable to move a valve arm (41) from a closed position (FIG. 4) toward an open position (FIG. 5) as the external temperature increases. An internal bimetal coil (61) is provided within the fluid reservoir chamber (35), having an inner end (65) fixed to a disc-like member (63) which rotates with the valve shaft (39), and an outer end (67) fixed to the valve arm (41). The internal coil (61) is preloaded such that, when the internal fluid temperature increases, the preload is relieved, and the valve arm (41) rotates from its open position (FIG. 5) back toward a closed position (FIG. 6), thus protecting the fluid from overheating and being damaged.

6 Claims, 6 Drawing Sheets

TEMPERATURE SENSITIVE DECOUPLING METHOD FOR VISCOUS FAN DRIVES

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to fluid coupling devices, and more particularly, to such devices which are capable of changing between the engaged and disengaged conditions, in response to variations in a predetermined temperature condition.

A fluid coupling device of the type to which the present invention relates typically includes an input coupling member and an output coupling member which cooperate with each other to define a viscous shear space such that torque may be transmitted from the input member to the output member in the presence of a viscous shear fluid. The output coupling member typically defines a fluid chamber and a valve plate separates the chamber into a reservoir and an operating chamber, with the input coupling member being disposed in the operating chamber.

In conventional fluid coupling devices ("fan drives") which are used to drive radiator cooling fans on vehicles, the valve plate includes a valving arrangement operable in response to changes in ambient air temperature to permit fluid to flow from the reservoir into the operating chamber. Typical fan drives include a discharge port defined near the outer periphery of the operating chamber with some form of pumping element, such that a small quantity of fluid is continually pumped from the operating chamber back to the reservoir chamber during normal operation.

There is the potential for the temperature of the fluid in the fan drive to exceed a predetermined maximum temperature. The potential for this to occur increases as the speed differential ("slip speed") increases between the input coupling member and the output coupling member. In other words, excessive shearing of the fluid can cause the fluid to exceed the predetermined maximum temperature. When this occurs, the fluid (typically a silicone fluid) undergoes a process in which the fluid first "droops", i.e., there is a physical breakdown of the polymer chains such that the fluid viscosity decreases, and the torque transmitting capability of the coupling decreases substantially. Then, with continued excess fluid temperature, the fluid again begins to cross-link, but does so excessively, and eventually the fluid "gels" or becomes nearly solid. If the fluid reaches this latter condition, the coupling device operates as if it were solid, with little or no slip speed in the engaged mode, and no capability of operating in the disengaged mode.

One attempt to overcome the above-described problem is illustrated in U.S. Pat. No. 5,248,018, assigned to the assignee of the present invention and incorporated herein by reference. In the device of the cited patent, the valve arm is generally Y-shaped, having two fill port covering portions, the first of which covers the fill port at low ambient temperatures. As ambient temperature increases, the valve arm rotates to a position in which the valve covering portions of the valve arm are on either side of the fill port, thus permitting filling. As internal fluid temperature increases as a result of high slip speeds, heat is dissipated from the fluid through the cover, further increasing the temperature of the ambient air around the external bimetal coil. As a result, the valve arm continues to rotate in the same direction until the fill port is covered by the second port covering portion. Once the fill port is covered, and the fluid in the operating chamber is pumped back to the reservoir, the fluid coupling operates in the disengaged mode, with the fluid thus being protected from the overheating condition described above.

Unfortunately, it has been found that the arrangement of the cited patent is most likely to be satisfactory on fan drives having relatively thin, stamped steel covers, as is typically the case on the relatively smaller, automotive fan drives. However, on the relatively larger, higher torque fan drives typically utilized on light trucks, and having cast aluminum covers, the heat transfer from the fluid to the external bimetal coil is generally insufficient to heat the bimetal coil enough to achieve the desired protection of the viscous fluid.

BRIEF SUMMARY OF THE INVENTION

Accordingly, it is an object of the present invention to provide an improved fluid coupling device having the ability to "decouple" (i.e., operate in the disengaged mode) in response to the internal fluid temperature exceeding a predetermined minimum.

It is a more specific object of the present invention to provide an improved fluid coupling device which accomplishes the above-stated object, even when utilized on a fluid coupling of the type having a cast aluminum cover.

It is a further object of the present invention to provide an improved fluid coupling device in which the closing of the fill port, in response to excessive internal fluid temperature, is at least partially dependent upon the external, ambient temperature.

The above and other objects of the invention are accomplished by the provision of an improved fluid coupling device of the type including a first rotatable coupling assembly, defining an axis of rotation, and including a body member and a cover member cooperating to define a fluid chamber. Valve means is associated with the first coupling assembly and disposed to separate the fluid chamber into a fluid operating chamber and a fluid reservoir chamber. A second rotatable coupling member is disposed in the fluid operating chamber and is rotatable relative to the first coupling assembly, and cooperates therewith to define a viscous shear space therebetween. The valve means is operable to control the flow of fluid from the reservoir chamber to the operating chamber and includes a plate-like member defining a fluid inlet port, a moveable valve member comprising a generally flat member disposed to rotate about the axis of rotation and in a plane generally parallel to the plate-like member. The valve means further comprises a valve shaft having an inner end operably associated with the valve member, and an outer end, and a temperature-responsive member associated with the outer end of the valve shaft and operable to rotate the valve shaft in response to variations in a predetermined external temperature condition.

The improved fluid coupling device is characterized by an internal bimetal coil disposed within the fluid reservoir chamber and surrounding the inner end of the valve shaft and including an inner end and an outer end. A disk-like member is fixed to be non-rotatable relative to the inner end of the valve shaft, the inner end of the internal bimetal coil being fixed relative to the disk-like member. The outer end of the internal bimetal coil is fixed relative to the valve member and comprises the means by which rotation of the valve shaft is transmitted into rotation of the valve member from a first, fill port covering position to a second, fill port uncovering position as the predetermined external temperature condition varies from a first, relatively lower temperature to a second, relatively higher temperature, respectively. The disk-like member is operable to maintain the bimetal coil in a preloaded condition, whereby, as the temperature of fluid in the reservoir chamber increases above a normal operating temperature, the preload on the internal bimetal coil is relieved, moving the valve member from the fill port uncovering position toward the fill port covering position.

DETAILED DESCRIPTION OF THE PREFERRED EMBODIMENT

Figure 1:
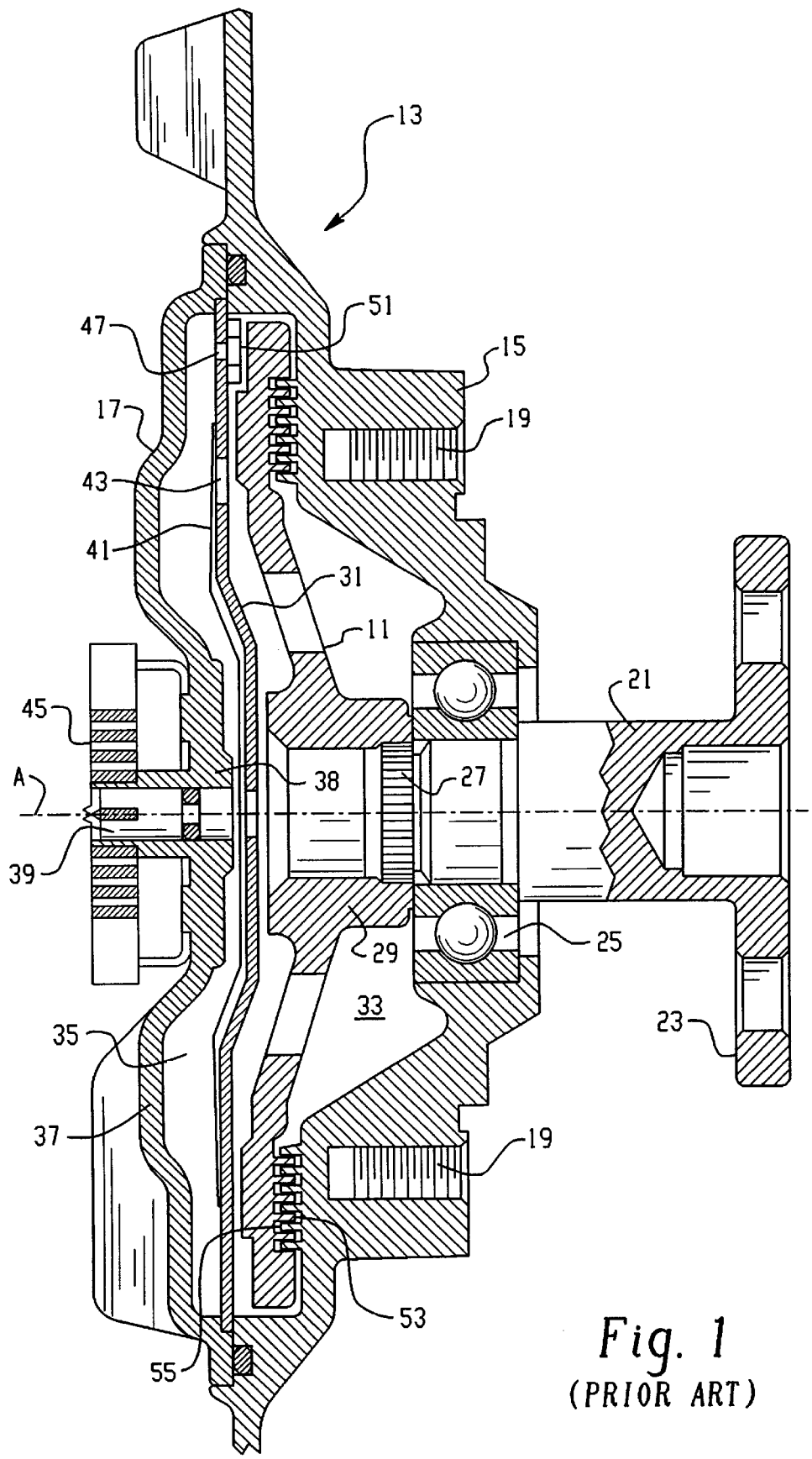
FIG. 1 is an axial cross-section of a typical ("PRIOR ART") fluid coupling device of the type which may utilize the present invention.

Referring now to the drawings, which are not intended to limit the invention, FIG. 1 illustrates one preferred form of a fluid coupling device of the type with which the present invention may be utilized. The fluid coupling device (labeled "PRIOR ART") of FIG. 1 includes an input coupling member generally designated 11 and an output coupling assembly, generally designated 13. The assembly 13 includes a die cast housing (body) member 15, and a die cast cover member 17, the members 15 and 17 being secured together by a rollover of the outer periphery of the housing 15, as is well known in the art. The use of the present invention is not limited to a cast cover fluid coupling, but its greatest benefit is when used with a cast cover and it will be described in connection therewith.

The fluid coupling device is adapted to be driven by a liquid cooled engine, and in turn, drives a radiator cooling fan, neither the engine nor the fan being shown herein. The fan may be attached to the housing member 15 by a plurality of threaded bores 19. It should be understood, however, that the use of the present invention is not limited to any particular configuration of fluid coupling device, or any particular application thereof, except as is specifically noted hereinafter.

The coupling device includes an input shaft 21 on which the input coupling member 11 is mounted. The input shaft 21 is rotatably driven, typically by means of a flange 23, which may be bolted to the mating flange of an engine water pump (also not shown). The input shaft 21 functions as a support for the inner race of a bearing set 25, which is seated on the inside diameter of the housing member 15. The forward end (left end in FIG. 1) of the input shaft 21 has an interference fit between a serrated portion 27 and an opening defined by a hub portion 29 of the input coupling member 11. As a result, rotation of the input shaft 21 causes rotation of the input coupling member 11.

The housing member 15 and the cover member 17 cooperate to define a fluid chamber, which is separated by a means of a circular plate-like member (or valve plate) 31, into a fluid operating chamber 33 and a fluid reservoir chamber 35. Thus, it may be seen that the input coupling member 11 is disposed within the fluid operating chamber 33.

The cover member 17 defines a raised, annular reservoir-defining portion 37 which is disposed to be generally concentric about an axis of rotation A of the device, and further defines a generally cylindrical shaft support portion 38. Rotatably disposed within the portion 38 is a valve shaft 39 extending outwardly (to the left in FIG. 1, and down in FIGS. 2 and 3) through the cover member 17. Attached to the inner end (right end in FIG. 1) of the valve shaft 39 is a valve arm 41, which may be better understood by reference to U.S. Pat. Nos. 3,055,473, and 5,248,018, both of which are assigned to the assignee of the present invention and incorporated herein by reference. Movement of the valve arm 41 controls the flow of fluid from the reservoir chamber 35 to the operating chamber 33, through a fill opening (port) 43 formed in the valve plate 31.

Operatively associated with the outer end of the valve shaft 39 is a temperature-responsive bimetal element which, in the subject embodiment, comprises a thermostatic bimetal coil member 45 which includes an inner end portion in engagement with the valve shaft 39. The manner in which the bimetal coil (external bimetal) member 45 operates to control movement of the valve arm, in response to variations in a predetermined external temperature condition, is well known in the art, but will be described in somewhat greater detail subsequently.

Referring still to FIG. 1, disposed adjacent the radially outer periphery of the operating chamber 33, the valve plate 31 defines a discharge opening 47. Disposed adjacent the opening 47 is a pumping element 51, also referred to as a "wiper", operable to engage the relatively rotating fluid in the operating chamber 33 to generate a localized region of relatively higher fluid pressure, and continually pump a small quantity of fluid back into the reservoir chamber 35, through the opening 47, the quantity of fluid being pumped back into the operating chamber being generally proportional to slip speed, as is well known in the art.

In the subject embodiment of the invention, the input coupling member 11 includes a rearward surface which defines a plurality of annular lands 53. The adjacent surface of the housing member 15 forms a plurality of annular lands 55. The annular lands 53 and 55 are interdigitated to define a serpentine-shaped viscous shear space therebetween, the viscous shear space being referred to hereinafter by means of the reference numerals 53, 55. It is believed that in view of the above-incorporated U.S. patents, those skilled in the art can fully understand the construction and operation of the fluid coupling device illustrated in FIG. 1, as well as the various flow paths for the viscous fluid under normal operating conditions.

Figure 2:
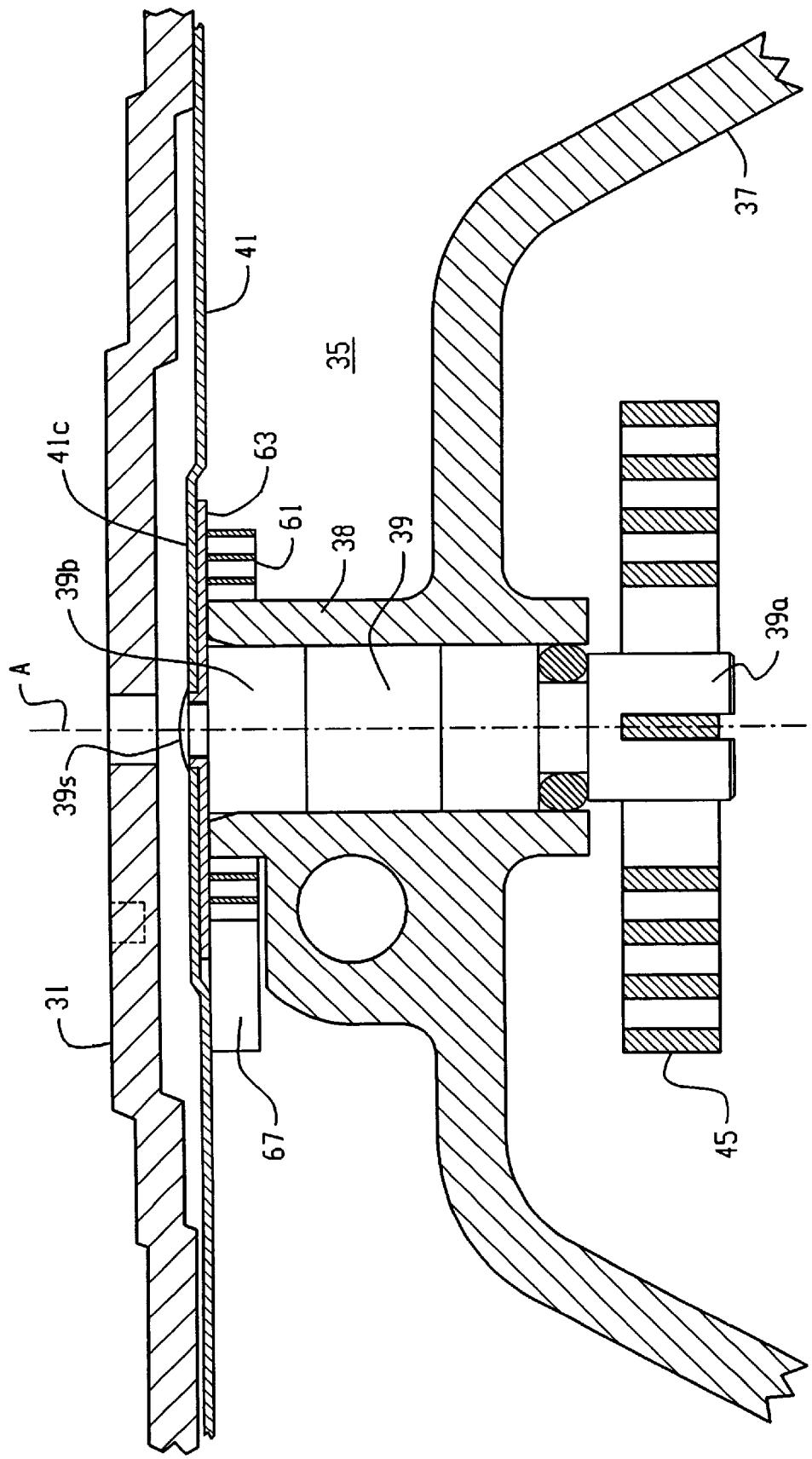
FIG. 2 is an enlarged, fragmentary axial cross-section, similar to FIG. 1, but including the arrangement of the present invention, and turned 90 degrees from the view of FIG. 1.
Figure 3:
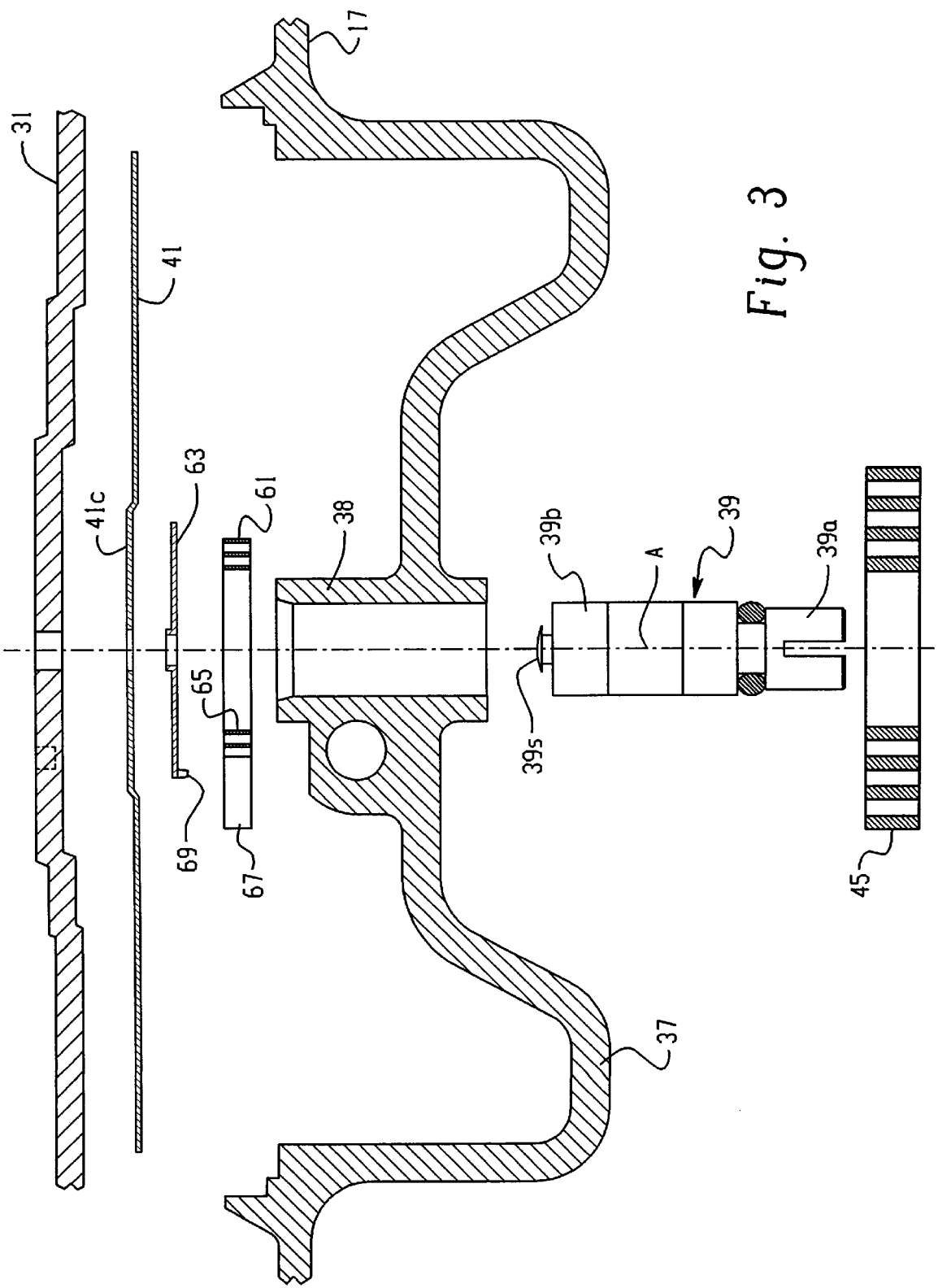
FIG. 3 is an exploded, fragmentary axial cross section, similar to FIG. 2, but on a slightly smaller scale.

Referring now primarily to FIGS. 2 and 3, the high temperature disengagement ("decoupling") mechanism of the present invention will be described. The valve shaft, generally designated 39, includes an outer end 39a which is slotted to engage an inner end of the external bimetal 45, as is well known. The valve shaft also includes an inner end 39b which extends just slightly inwardly of the shaft support portion 38. Surrounding the inner end of the shaft support portion 38 is an internal bimetal coil 61, and disposed immediately adjacent the internal coil 61 is a disk-like member 63 which may be retained against the inner end 39b of the valve shaft 39, such as by a staked portion 39s, so that the member 63 is fixed to rotate with the valve shaft 39. Although, as may best be seen in FIG. 2, the internal bimetal coil 61 actually surrounds the inner end of the shaft support portion 38, what is more significant is that the coil 61 also surrounds the inner end 39b of the valve shaft 39, and is disposed adjacent the disk-like member 63.

In the subject embodiment, the valve arm 41 is not entirely planar, as is typical, but instead, defines a central raised portion 41c, primarily to accommodate the disk-like member 63, for reasons which will become apparent subsequently. It is important that the valve arm 41 is not fixed to rotate with the valve shaft 39, but instead is rotatable relative to the valve shaft 39 and member 63. As may best be seen in FIG. 4, in the subject embodiment of the invention, and by way of example only, the fluid inlet port actually comprises a pair of inlet ports 43a and 43b, while the valve arm generally designated 41 includes a pair of port covering portions 41a and 41b.

Figure 4:
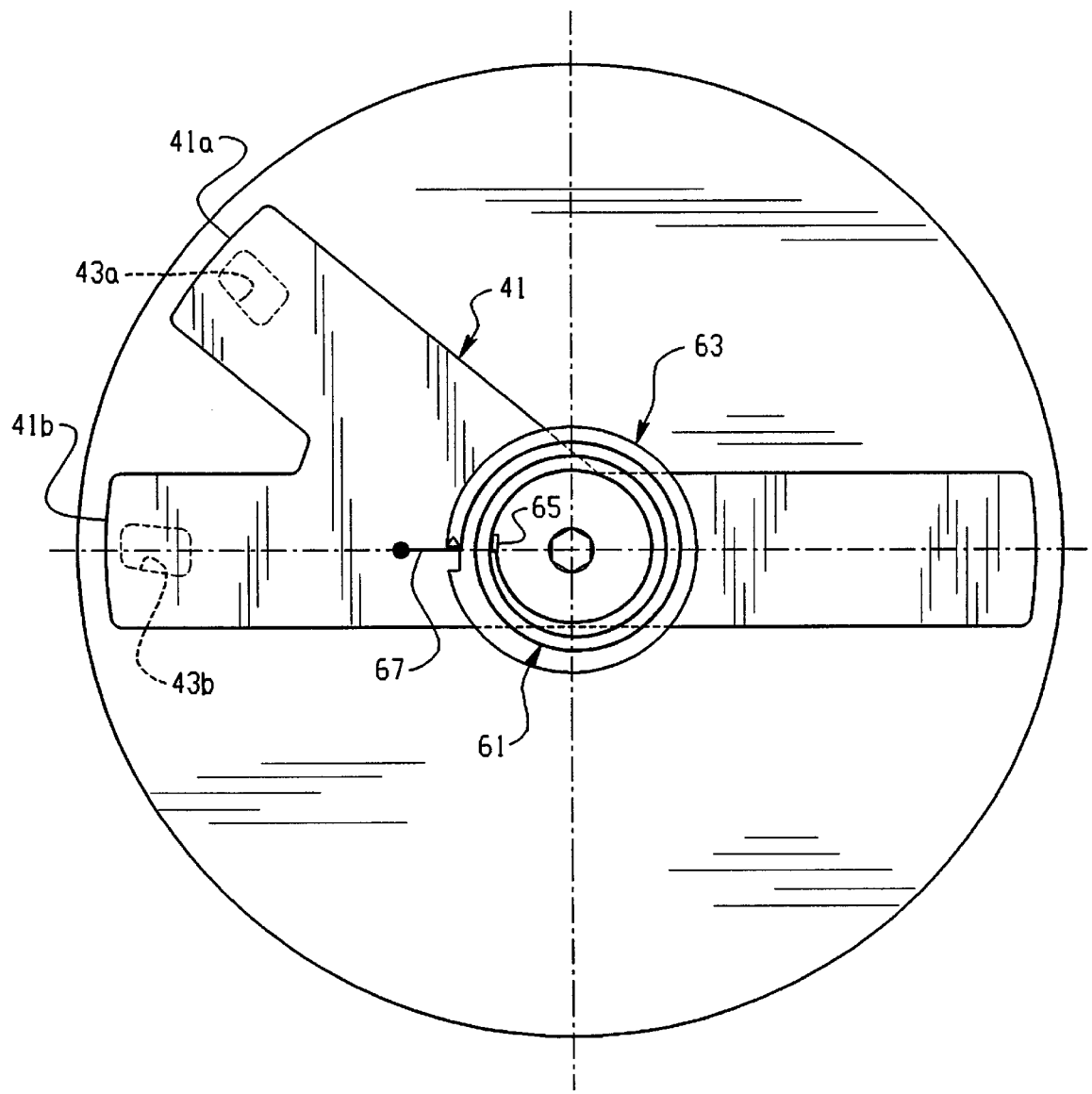
FIGS. 4, 5, and 6 are somewhat schematic, plan views, in an upward direction in FIGS. 2 and 3, of the valving and high temperature disengagement mechanism of the present invention, shown in three different operating positions, with FIGS. 5 and 6 being fragmentary and further enlarged.

Referring now also to FIG. 4, the internal bimetal coil 61 includes an inner end 65 and an outer end 67. As may best be seen in FIGS. 3 and 6, the disk-like member 63 includes, at its outer periphery, an outwardly-extending (downwardly in FIG. 3) tab 69 which, under normal operating conditions functions to hold the outer end 67 of the internal coil 61. The internal coil 61 is preloaded in the following manner. The outer end 67 is held against the tab 69 as the inner end 65 is wound clockwise (as viewed in FIGS. 4, 5, and 6) to a predetermined amount of preload. The inner end 65 is then fixed relative to the member 63 by any suitable means, such as welding, which will prevent the coil 61 from "unwinding". The outer end 67 is prevented from un-winding by the tab 69, while the inner end 65 moves with the disc-like member 63. Similarly, the outer end 67 of the bimetal coil 61 is held fixed relative to the valve arm 41 by any suitable means, such as welding.

The preload torque is entirely contained by the disc-like member 63, by means of the fixed inner end 65 and the tab 69. When the internal temperature of the fluid coupling device is below a prescribed maximum value, there are no forces acting on the valve shaft 39, or on the external bimetal 45, or on the valve arm 41 as a result of the functioning of the internal bimetal coil 61.

Figure 5:
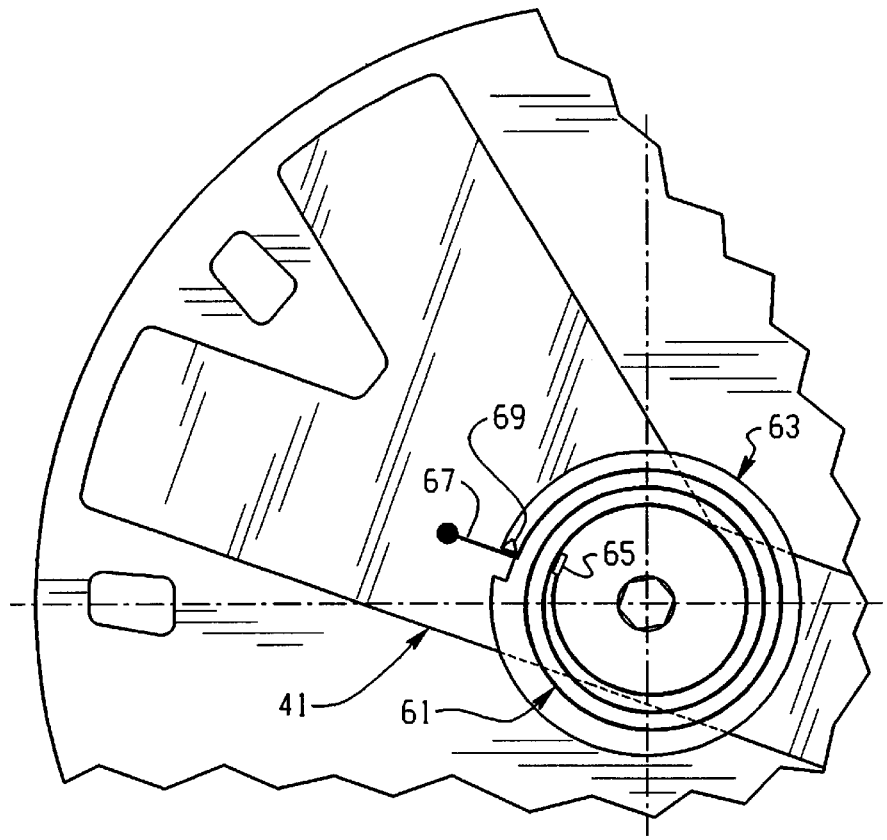
Figure 6:
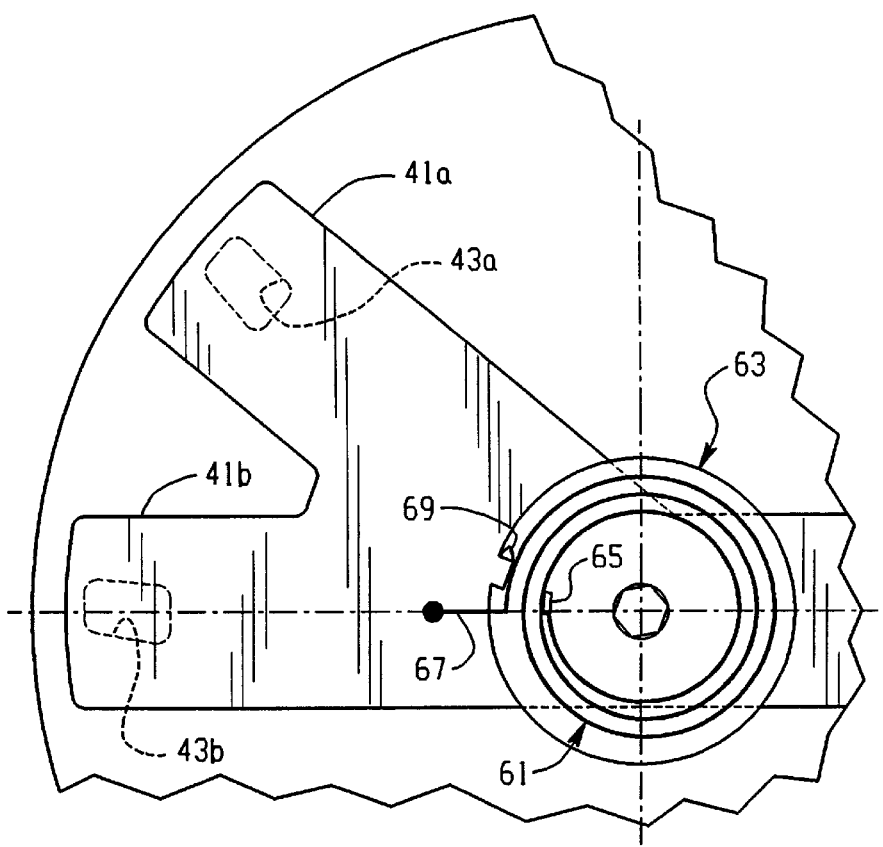

Referring now primarily to FIGS. 4 through 6, the operation of the high temperature disengagement mechanism of the present invention will be described. During normal operating conditions, when the ambient temperature around the external bimetal coil 45 is relatively low (e.g., less than about 180° Fahrenheit), the valve arm 41 will be in the position shown in FIG. 4 with the port covering portions 41a and 41b covering the fill ports 43a and 43b, respectively. In this condition, most of the viscous fluid is in the reservoir chamber 35, and relatively little of the fluid is in the operating chamber 33, such that the fluid coupling operates in the disengaged condition as is generally well known to those skilled in the art.

As the ambient air temperature around the external bimetal coil 45 begins to increase, the inner end of the coil 45 begins to rotate clockwise (when viewed from the left end in FIG. 1, or when looking upward in FIGS. 2 and 3). With increasing external ambient temperature, the rotation of the inner end of the external bimetal coil 45 rotates the valve shaft 39, the disk-like member 63, the internal bimetal coil 61, and the valve arm 41 as a unit. Such unitary movement occurs because an inner cylindrical portion (see FIG. 3) of the disk-like member 63 is trapped between the staked portion 39s and the end 39b of the valve shaft, and therefore, must rotate with the valve shaft. The valve arm 41 rotates with the member 63 and valve shaft 39, because the outer end 67 of the internal coil 61 is still held against tab 69 as a result of the preload torque in the bimetal coil 61 and the outer end 67 being fixed relative to the valve arm 41. As a result, the valve arm 41 is moved to the position shown in FIG. 5 in which each of the port covering portions 41a and 41b are rotationally displaced from the position shown in FIG. 4 and now uncover the fill ports 43a and 43b, respectively.

As the fill ports 43a and 43b are uncovered, as shown in FIG. 5, fluid flows in a known manner from the reservoir 35 into the operating chamber 33, such that shearing of the viscous fluid occurs in the land and groove area 53, 55 to transmit torque from the input to the output. This constitutes the engaged mode of operation of the fluid coupling device. If the input speed continues to increase, one result will be an increase in the "slip speed", i.e., the difference between the output speed and the input speed. As was explained in the BACKGROUND OF THE DISCLOSURE, an increase in slip speed means greater shearing of the viscous fluid, and typically results in greater heat generation within the fluid.

Figure 7:
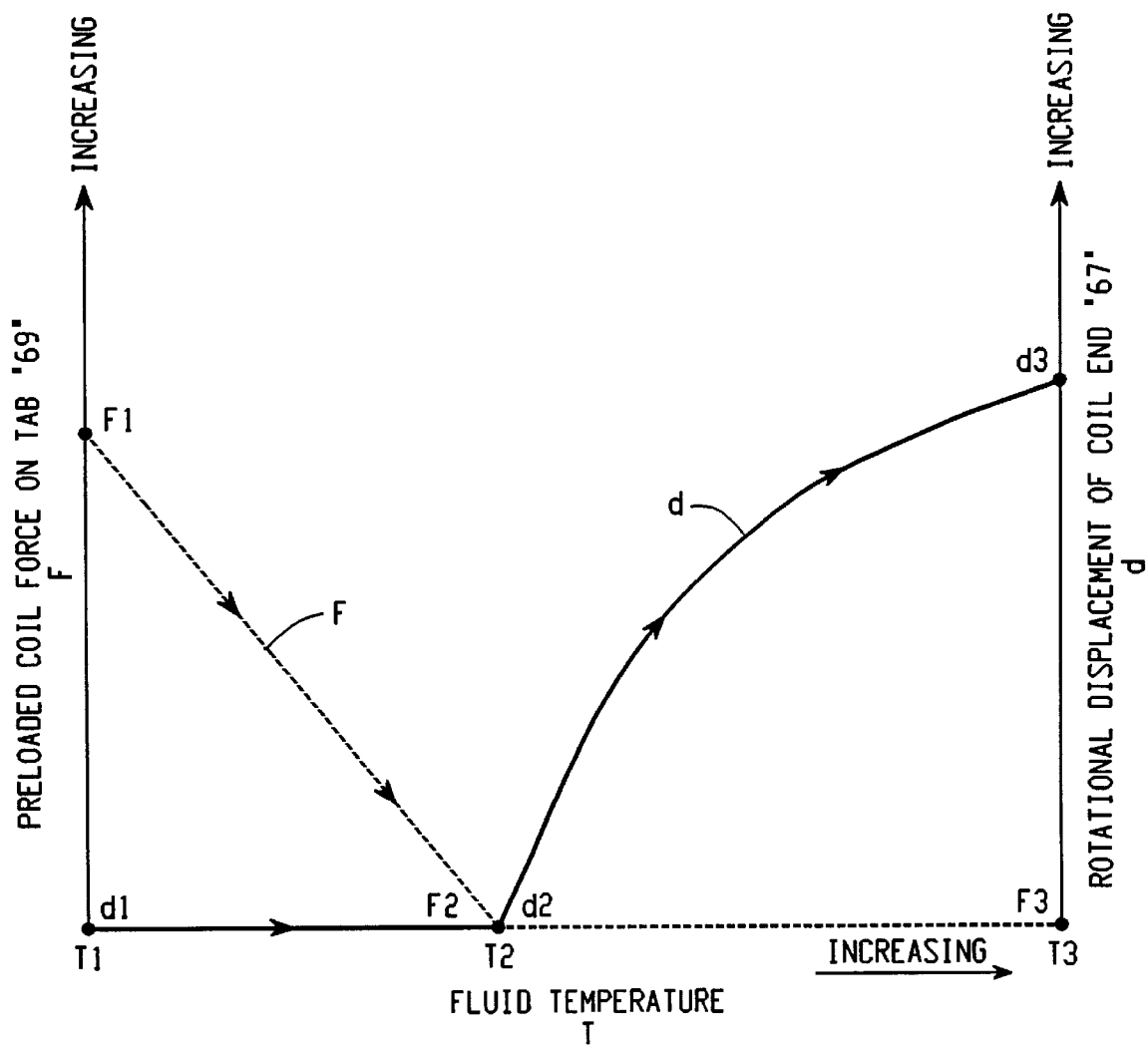
FIG. 7 is a graph of the internal bimetal preloaded coil force and rotational displacement as a function of the internal fluid temperature.

Referring now primarily to FIGS. 6 and 7, as the fluid temperature within the reservoir 35 approaches a temperature (T3) which is considered "critical", the temperature of the internal thermostatic bimetal coil 61 also increases. In accordance with one important aspect of the invention, the internal bimetal coil 61 is designed such that, when the internal fluid temperature is relatively low ("T1"), the coil 61 will function to exert a force "F1" against the tab 69 with the outer end 67 as described previously. Displacement of the outer end 67 relative to the tab 69 is zero at "d1". Then, as the fluid temperature increases further, the coil is subsequently heated and the force which the coil 61 exerts against the tab 69, with the outer end 67, decreases toward "F2" in the graph of FIG. 7. In other words, the coil 61 begins to un-wind. As the internal coil 61 is heated with increasing fluid temperature, a predetermine temperature ("T2") will eventually be reached in which all of the preload torque or "wind-up" is relieved ("F2"=0). Displacement of coil end 67 is still zero at "d2".

Further heating of the internal bimetal coil 61 results in un-winding of the coil and the outer end 67 will displace rotationally from the tab 69 in a counterclockwise direction, resulting in movement of the outer end 67 relative to the disc-like member 63. With the valve arm 41 being fixed to the outer end 67, this internal temperature condition causes movement of the valve arm 41 relative to the member 63 and valve shaft 39, and, in the subject embodiment and by way of example only, the relative movement is in a direction opposite to that which results from heating of the external bimetal coil 45. Thus, in the subject embodiment, increasing internal fluid temperature will move the outer end 67 of the internal bimetal coil 61 from the position shown in FIG. 5 in a counterclockwise direction to the position shown in FIG. 6. It should be noted that the outer end 67, during this "unwinding" process moves away from the tab 69 on the disk-like member 63, and as this occurs, the valve arm 41 is rotated counterclockwise from the position shown in FIG. 5, back to a position in which the port covering portions 41a and 41b again cover the fill ports 43a and 43b, respectively.

As a result, the excessively heated fluid in the operating chamber 33 will be pumped out, and returned to the reservoir 35, in the usual manner, and with the fill ports 43a and 43b blocked, fluid doesn't flow from the reservoir back into the operating chamber. Instead, the fluid remains in the reservoir, thus giving the fluid an opportunity to cool off enough that the fluid coupling can again operate in the engaged mode without damaging the fluid. It is believed to be within the ability of those skilled in the art to select the various operating parameters, temperatures, coil design, and fluid such that the fluid coupling will operate in the manner described above, giving sufficient cooling, but at the same time, operating in the disengaged mode when required to save the fluid.

In accordance with another important aspect of the present invention, if, while the internal temperature is increasing, the external ambient temperature is also increasing, the external bimetal coil 45 will move the disk-like member 63 further in the clockwise direction than the movement shown in going from the disengaged condition of FIG. 4 to the engaged condition of FIG. 5. By viewing FIGS. 5 and 6, it may be seen that if the valve shaft 39 and the disk-like member 63 are rotated further in the clockwise direction than shown in FIG. 5, the valve arm 41 will also be rotated further in the clockwise direction. Then, as the internal temperatures increase, and the preload in the internal bimetal coil 61 is relieved, the valve arm 41 will again rotate in the counterclockwise direction as described previously, but because it started from a position further clockwise than in FIG. 5, the valve arm 41 will not rotate counterclockwise all the way to the position shown in FIG. 6. Instead, the valve arm may, with high enough ambient temperature surrounding the external bimetal 45, move counterclockwise to a position in which the port covering portions 41a and 41b are only partially covering the fill ports 43a and 43b, respectively.

The result will be that a certain amount of fluid is still permitted to flow from the reservoir 35 to the operating chamber 33 so that the fluid coupling does not operate totally in the disengaged mode, but instead, is partially engaged to provide some fan speed and the resulting movement of air through the vehicle radiator, in response to the high ambient temperatures. In other words, it is an important aspect of the present invention that the operation of the internal bimetal coil 61 may be made at least somewhat dependent upon the instantaneous condition of the external bimetal coil 45.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A fluid coupling device of the type including a first rotatable coupling assembly, defining an axis of rotation, and including a body member and a cover member cooperating to define a fluid chamber; valve means associated with said first coupling assembly and disposed to separate said fluid chamber into a fluid operating chamber and a fluid reservoir chamber; a second rotatable coupling member disposed in said fluid operating chamber, and being rotatable relative to said first coupling assembly, and cooperating therewith to define a viscous shear space therebetween; said valve means being operable to control the flow of fluid from said reservoir chamber to said operating chamber and including a plate-like member defining a fluid inlet port, a moveable valve member comprising a generally flat member disposed to rotate about said axis of rotation and in a plane generally parallel to said plate-like member; said valve means further comprising a valve shaft having an inner end operably associated with said valve member and an outer end, and a temperature-responsive member associated with said outer end of said valve shaft and operable to rotate said valve shaft in response to variations in a predetermined external temperature condition; characterized by:

(a) an internal bimetal coil disposed within said fluid reservoir chamber and surrounding said inner end of said valve shaft, and including an inner end and an outer end;

(b) a disc-like member fixed to be non-rotatable relative to said inner end of said valve shaft, said inner end of said internal bimetal coil being fixed relative to said disc-like member;

(c) said outer end of said internal bimetal coil being fixed relative to said valve member and comprising the means by which rotation of said valve shaft is transmitted into rotation of said valve member from a first, fill port covering position to a second, fill port uncovering position as said predetermined external temperature condition varies from a first, relatively lower temperature to a second, relatively higher temperature, respectively; and (d) said disc-like member being operable to maintain said internal bimetal coil (61) in a preloaded condition, whereby, as the temperature of fluid in said reservoir chamber increases above a normal operating temperature, said preload on said internal bimetal coil is relieved, moving said valve member from said fill port uncovering position toward said fill port covering position.

2. A fluid coupling device as claimed in claim 1 characterized by said cover member comprising a cast aluminum member including a generally cylindrical shaft support portion, said valve shaft being rotatably supported within said shaft support portion.

3. A fluid coupling device as claimed in claim 1 characterized by said valve member comprising a generally Y-shaped member, including first and second inlet port covering portions, and said fluid inlet port comprising first and second inlet portions.

4. A fluid coupling device as claimed in claim 1 characterized by said temperature-responsive member comprises an external bimetal coil operable to rotate said valve shaft in response to variations in ambient air temperature.

5. A fluid coupling device as claimed in claim 1 characterized by said disc-like member being disposed axially between said inner end of said valve shaft and said valve member, and being disposed axially between said internal bimetal coil and said valve member.

6. A fluid coupling device as claimed in claim 1 characterized by said disc-like member including a tab portion normally in engagement with said outer end of said internal bimetal coil to maintain said coil in said preloaded condition.

* * * * *